United States Patent [19]

Pian et al.

[11] Patent Number: 5,099,418
[45] Date of Patent: Mar. 24, 1992

[54] DISTRIBUTED DATA DRIVEN PROCESS

[75] Inventors: Chao-Kuang Pian; Minh-Tram D. Nguyen, both of Anaheim; Theodore E. Posch, Fullerton, all of Calif.; Jeffrey E. Juhre, Arlington Heights, Ill.

[73] Assignee: Hughes Aircraft Company, Los Angeles, Calif.

[21] Appl. No.: 538,349

[22] Filed: Jun. 14, 1990

[51] Int. Cl.$^5$ .................. G06F 13/00; G06F 15/16
[52] U.S. Cl. .................. 395/650; 364/228.8; 364/229.2; 364/240.4; 364/260.1; 364/239.1; 364/DIG. 1; 364/DIG. 2; 364/931.42; 364/931.46; 364/931.48
[58] Field of Search ... 364/200 MS File, 900 MS File

[56] References Cited

U.S. PATENT DOCUMENTS

| | | | |
|---|---|---|---|
| 3,833,889 | 9/1974 | Gray | 340/172.5 |
| 4,325,120 | 4/1982 | Colley et al. | 364/200 |
| 4,402,046 | 8/1983 | Cox et al. | 364/200 |
| 4,414,624 | 11/1983 | Summer, Jr. et al. | 364/200 |
| 4,571,782 | 2/1986 | Hatada et al. | 364/200 |
| 4,724,520 | 2/1988 | Athanas et al. | 364/200 |

*Primary Examiner*—Michael R. Fleming
*Assistant Examiner*—Robert S. Hauser
*Attorney, Agent, or Firm*—Wanda K. Denson-Low

[57] ABSTRACT

A data driven method for coordinating the processing of arithmetic tasks in a multiple computer system having a multiplicity of arithmetic processors by determining whether an arithmetic task is in a blocked condition or is in an execution ready condition. A source distributed processor stores data in a local memory for processing by a local processor and then transfers the processed data to a global memory for buffering in preparation for subsequent processing by a destination distributed processor. The source distributed processor generates a produce message to a destination distributed processor to indicate that the data to be transferred is available in a buffer in the global memory. The destination distributed processor loads the data to be transferred from the buffer in the global memory and then generates a consume message to the source distributed processor to indicate that the data has been transferred from the global memory and the buffer in the global memory is now available.

3 Claims, 4 Drawing Sheets

DISTRIBUTED DATA DRIVEN PROCESS

This invention was made with Government support. The Government has certain rights in this invention.

BACKGROUND

The field of the invention is digital computers and, in particular, distributed multiprocessors implementing distributed data driven processes.

Multiple processors are implemented to distribute tasks and to accommodate complex processing requirements. Communication between multiple processors operating asynchronously poses communication problems which complicate the system hardware and software and reduce system performance.

SUMMARY OF THE INVENTION

The present invention is an improvement in multiple processor distributed systems. It is implemented with a global memory and with multiple distributed processors each having local memory and operating in the form of a distributed data driven process. In a source distributed processor, data is stored in a local memory for processing by a local processor and is then transferred to a global memory for buffering in preparation for subsequent postprocessing by a destination distributed processor. The source distributed processor generates a produce message to the destination distributed processor to indicate that the data to be transferred is available in a buffer in the global memory. The destination distributed processor loads the data to be transferred from the buffer in the global memory and then generates a consume message to the source distributed processor to indicate that the data has been transferred from the global memory and that the buffer in the global memory is available. A distributed processor also updates and evaluates the status of the tasks assigned to that distributed processor for execution readiness when a consume message or a produce message is received.

A preferred embodiment of a data driven multiple processor distributed system comprises a global memory and a plurality of distributed processors, each distributed processor having a local memory and a control processor. The data driven process is implemented with multi-processors executing stored programs. First, a block of data is transferred from the local memory of a source distributed processor to the global memory. Then, a produce message is generated by the control processor in the source distributed processor to the control processor of a destination distributed processor in response to the transferring of the block of data from the local memory of the source distributed processor to the global memory. Then the block of data is transferred from the global memory to the local memory of a destination distributed processor in response to the produce message. Then, a consume message is generated from the control processor of the destination distributed processor to the control processor of the source distributed processor in response to the transferring of the block of data from the global memory to the local memory of the source distributed processor. Then, the local processor of the destination distributed processor processes the block of data transferred from the global memory to the local memory of the destination distributed processor or outputs the block of data transferred from the global memory to the local memory of the destination distributed processor.

Accordingly, a feature of the present invention is to provide an improved distributed processor system and method. Another feature of the present invention is the communication of data and messages between distributed processors. Another feature of the present invention is an improved multiple processor distributed system having a global memory and multiple distributed processors each having local memory and implemented in the form of a distributed data driven process.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
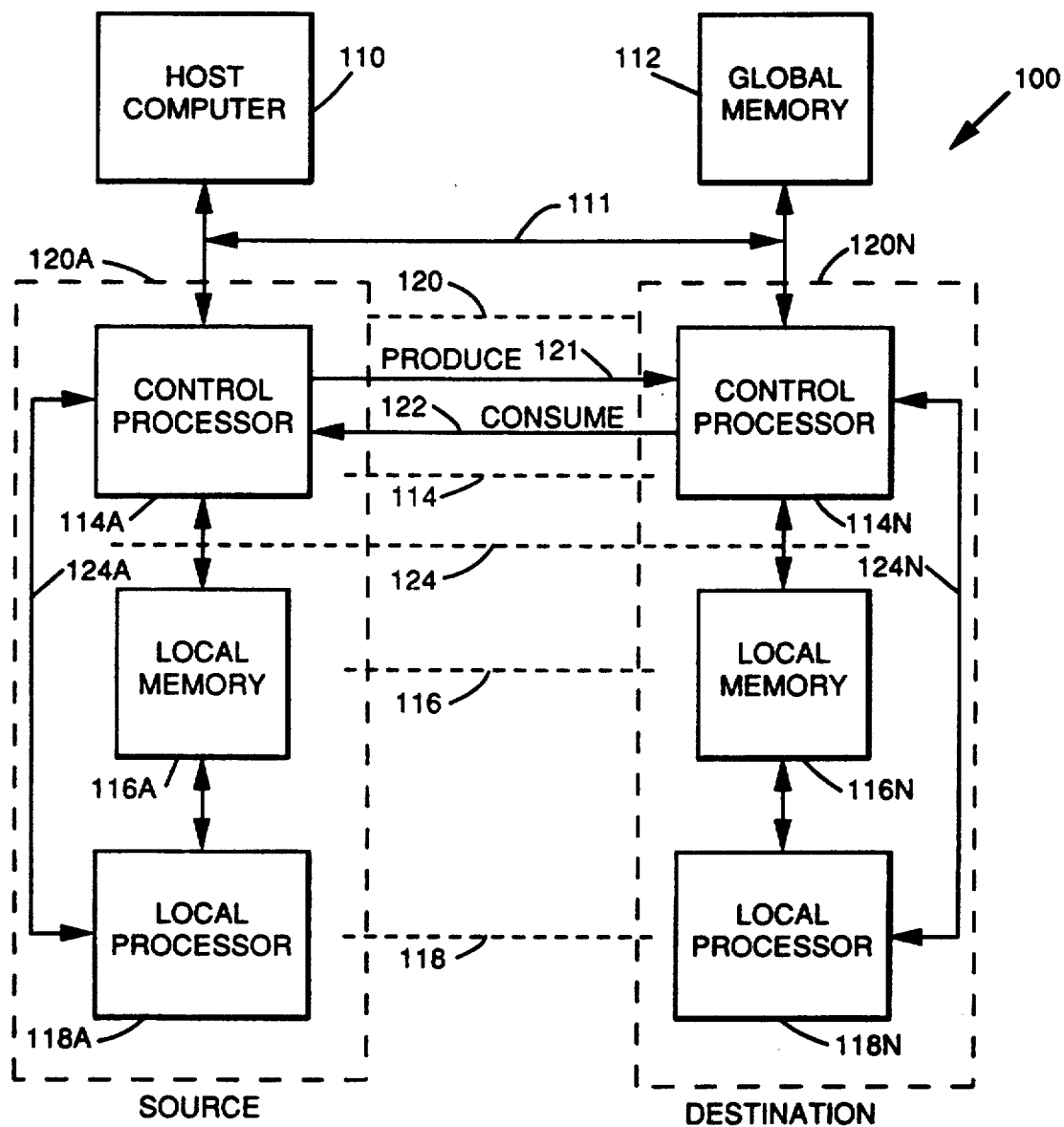
FIG. 1 is a block diagram representation of a multiprocessor distributed system using a global memory and inter-processor messages in accordance with the principles of the present invention.

Referring now to FIG. 1, a distributed multi-processor system 100 in accordance with the principles of the present invention is implemented with a host computer 110 coupled to a global memory 112 and to multiple distributed processors 120, 120A-120N with a bus 111. The multiple distributed processors each contain a control processor 114 coupled to the bus 111, a local memory 116 coupled to the control processor 114, and a local processor 118 coupled to the local memory 116 and to the control processor 114.

The multiple processor system 100 implements inter-processor messages communicated to control inter-processor operations. The host computer 110, implemented with a Digital Equipment Corporation VAX computer, for example, communicates with the multiple distributed processors 120, 120A-120N and communicates with a global memory 112 over the bus 111. The local memories 116 store blocks of data for processing by the local processors 118. The local processors 118 perform arithmetic processing, control processing, input processing, and output processing associated with blocks of data. The control processors 114 control processing by the local processors 118 and control inter-processor communication. The control processors 114 control transfer of data between the global memory 112 and the local memory 116 and control processing by the local processors 118 and the local processors 118 generate task complete messages to the control processors 114 along dedicated message links 124 or by the use of a mail box in the local memory 116.

The global memory 112 facilitates communication of data between the multiple processors. Data to be processed is stored in a buffer in the global memory 112 by the control processor at the source of the data and is accessed by the control processor at the destination of the data. Data buffers in the global memory 112 and in the local memories 116 are double buffers. A double buffer is implemented with two buffers, one for loading information and one for storing or unloading information, to facilitate concurrent memory operations.

Source and destination terminology is used to identify the source of the data or the message that is transferred and to identify the destination of the data or the message that is transferred. The distributed processor 120A is the source distributed processor having the source local processor 118A, the source local memory 116A, and the source control processor 114A. The distributed processor 120N is the destination distributed processor having the destination local processor 118N, the destination local memory 116N, and the destination control processor 114N. The source local processor 118A processes data stored in the source local memory 116A and generates a task complete message to the source control processor 114A along data link 124A. The source control processor 114A transfers the data to a buffer in the global memory 112 in response to the task complete message and then generates a produce message 121 to the destination control processor 114N to communicate the condition that the data buffer in the global memory 112 is full. The destination control processor 114N transfers the data from the buffer in the global memory 112 into the destination local memory 116N and generates an execute message to the destination local processor along data link 124N to command processing of the data by the destination local processor 118N. In a blocked and execution ready embodiment, the control processor 114N generates.

The execute message if the task assigned to the destination local processor 118N to processes the newly transferred data changed the processor state from a blocked state to an execution ready state. The destination control processor generates a consume message 122 to the source control processor 114A when the data has been transferred from the data buffer in the global memory 112 into the destination local memory 116N for subsequent processing. A task may be preassigned to a local processor and it may have one or more inputs and one or more outputs. A task is in an execution ready state when each of the inputs has sufficient data in local memory 116 to process the task and if each of the outputs has an output buffer reserved in the global memory 112 such that output data generated in the local memory 116 can be transferred to the global memory 112 when a task completes the processing thereof. A task is in a blocked state if it is not in an execution ready state. Upon receiving of a consume message from the destination control processor 114N, the source control processor 114A may detect that a task that is assigned to the source local processor 118A changes from a blocked state to an execution ready state. In this case, the source control processor 114A generates an execute message to the source local processor 118A to initiate processing. The designation of source and destination distributed processors is an instantaneous designation that is determined by the direction of data transfer. This designation can change dynamically. For example, a data block is received by a processor designated as a destination processor which processes and transmits the data block and hence is redesignated a source processor. The redesignation from being a destination processor to being a source processor is only indicated for convenience of discussion.

Figure 2:
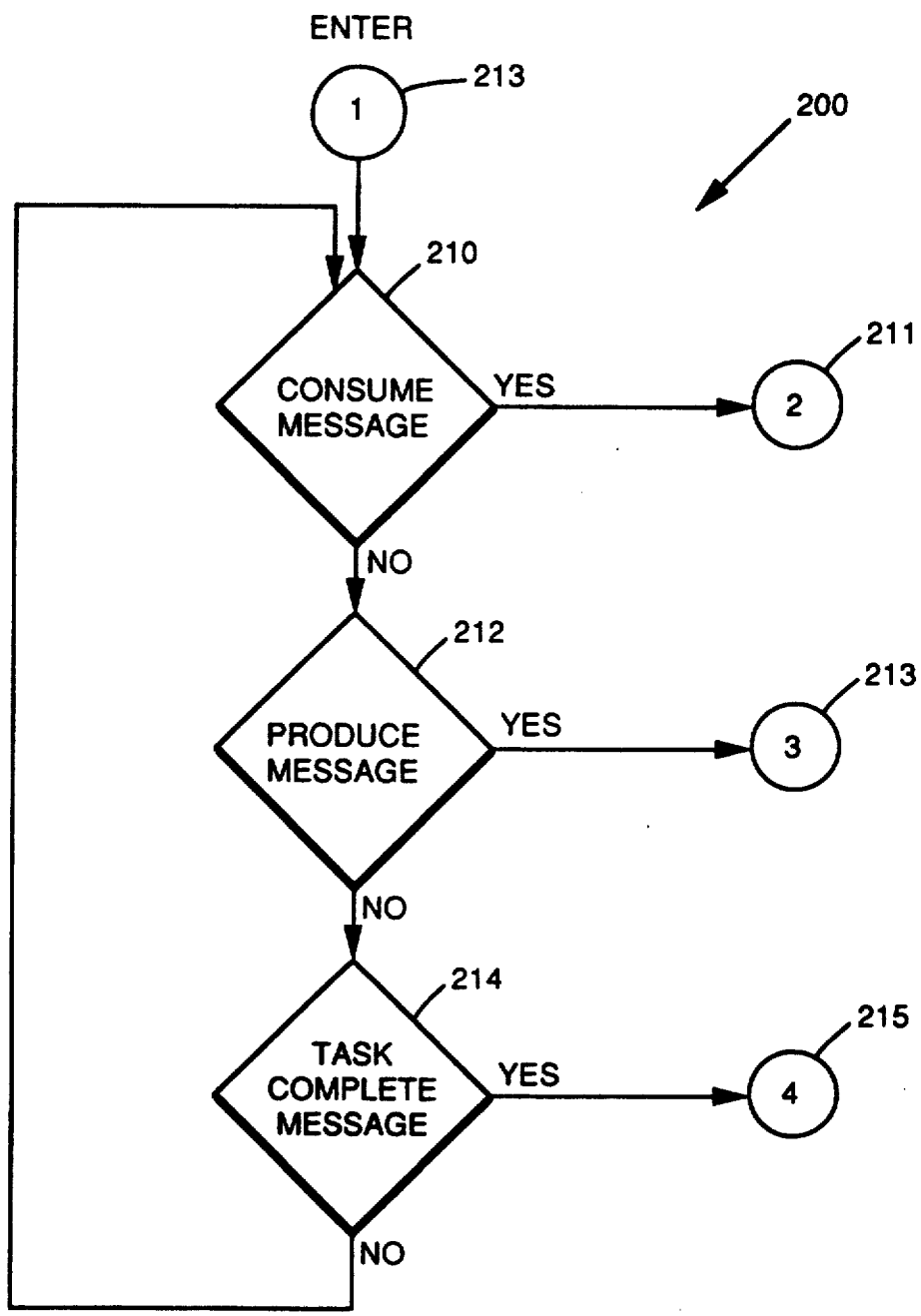
FIG. 2 is a detailed flow diagram of an executive program routine using polling.

Program operations in the control processors and in the local processors are data driven and are message controlled. Detection of a message is performed by polling under program control. A polling executive routine 200 that is data driven is shown in FIG. 2. The program loops through the executive routine 200 testing for messages until a message is detected. When a message is detected, the program branches out of the executive routine and executes the routine that is related to the message.

Referring now to FIG. 2, operation begins upon system turn on and initialization by entering the executive routine through the ENTER path. A test is made in the CONSUME MESSAGE test operation 210 to determine if a consume message has been received. If a consume message has been received, the program branches along the YES path from the CONSUME MESSAGE test operation 210 to execute the consume message routine 211. If a consume message has not been received, the program branches along the NO path from the CONSUME MESSAGE test operation 210 to the PRODUCE MESSAGE test operation 210 to determine if a produce message has been received. If a produce message has been received, the program branches along the YES path from the PRODUCE MESSAGE test operation 212 to execute the produce message routine 213. If a produce message has not been received, the program branches along the NO path from PRODUCE MESSAGE test operation 212 to the TASK COMPLETE MESSAGE test operation 214 to determine if a task complete message has been received. If a task complete message has been received, the program branches along the YES path from TASK COMPLETE MESSAGE test operation 214 to execute the task complete message routine 215. If a task message has not been received, the program branches along the NO path from TASK COMPLETE MESSAGE test operation 214 and loops back to the CONSUME MESSAGE test operation 210.

Figure 3:
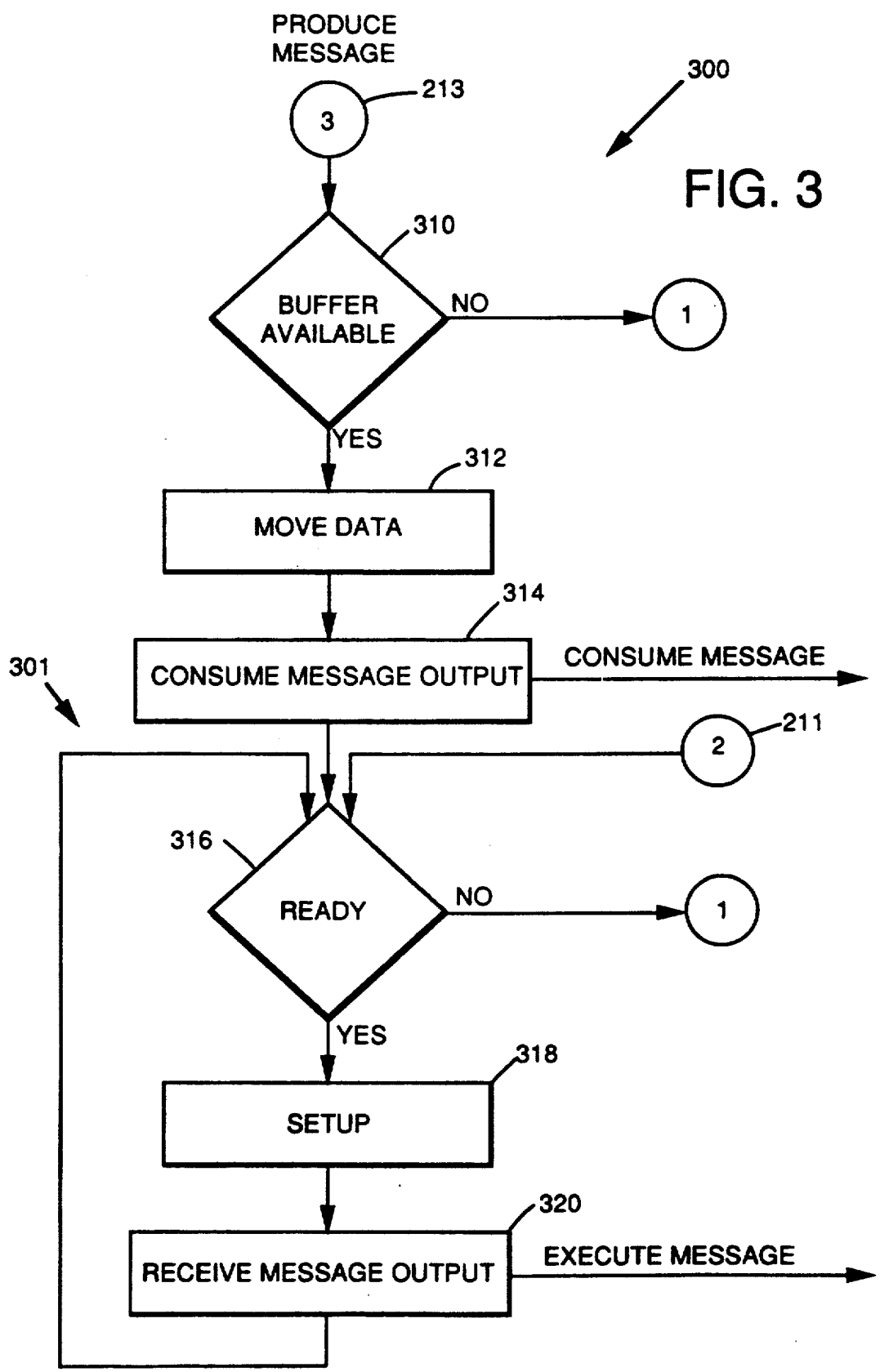
FIG. 3 is a detailed flow diagram of produce message and consume message program operations.

Referring now to FIG. 3, when a produce message is detected with the executive routine in the destination distributed processor 120N, the program branches along the YES path 213 from the PRODUCE MESSAGE test operation 212 to execute the produce message routine 300 in the destination distributed processor 120N. The program determines if a local data buffer is available in the destination local memory 116N with the BUFFER AVAILABLE test operation 310. If a local data buffer is not available, the program branches along the NO path to return to the executive routine, as shown in FIG. 2, to wait for a local data buffer to become available. If a local data buffer is available, the program branches along the YES path to the MOVE DATA operation 312 to move data from the global memory 112 to the destination local memory 116N to prepare for processing of the data. A task status can be maintained, where the task status may be updated in the MOVE DATA operation 312. This task status updating changes the task state from a blocked state to an execution ready state. The program then proceeds to the CONSUME MESSAGE OUTPUT operation 314 to generate a consume message to the processor that is the source of the produce message being executed to inform the source processor 120A that the buffer in global memory is now available for use by the source processor 120A.

The program executes the execute message routine 301 when exiting the processing of the produce message from the CONSUME MESSAGE OUTPUT operation 314 or in response to detection of a consume message from the CONSUME MESSAGE test operation 210 along path 211. In the case of entering the execute message routine 301 from path 211, the affected task status may be updated before entering the routine. The program proceeds to the READY test operation 316 to determine if the task is ready to be executed, such as if data is available in a buffer in the local memory 116N and the local processor 118N is available for processing and the output buffer is available. This can be implemented by testing if the task status is in the blocked state or in the execution ready state. If data is not yet available in a buffer in the local memory 116N or if the local processor 118N is not available for processing or if the output buffer is not available, such as with a blocked state, then the program branches along the NO path from the READY test operation 316 to the executive routine 200, as shown in FIG. 2. If data is available in a buffer in the local memory 116N and if the local processor 118N is available for processing and if the output buffer is available, then the program branches along the YES path from the READY test operation 316 to generate the execute message. The program proceeds to the SETUP operation 318 to setup the task parameters and to update the task status and then to the EXECUTE MESSAGE OUTPUT operation 320 to output the execute message to the related local processor 118N to initiate processing of the data in the local memory 116N and then to return to the executive routine 200, as shown in FIG. 2.

Figure 4:
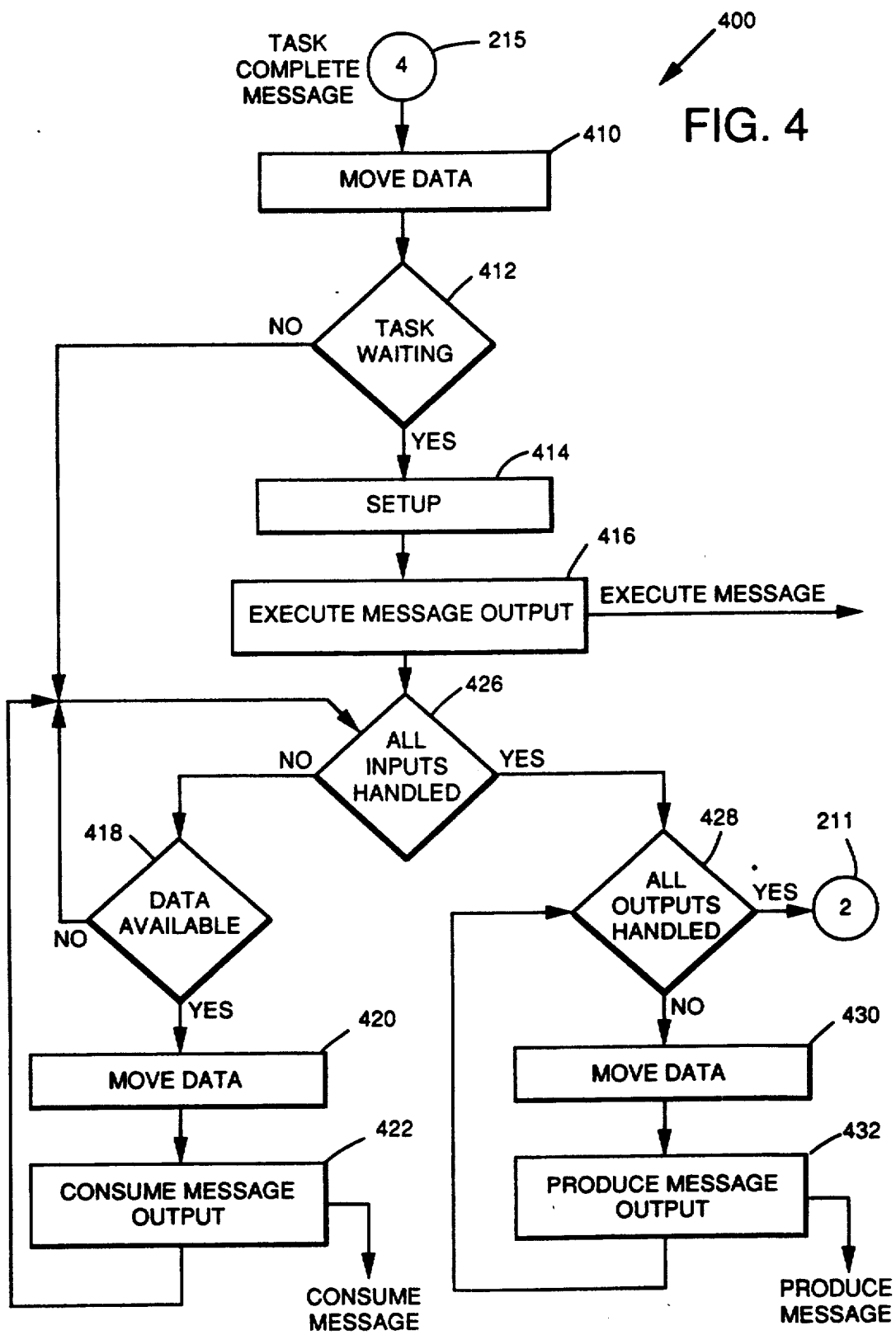
FIG. 4 is a detailed flow diagram of task complete message program operations.

Referring now to FIG. 4, when a task complete message is detected by the executive routine, the program branches along the YES path 215 from the TASK COMPLETE MESSAGE test operation 214 to execute the task complete message routine 400. The program proceeds to the MOVE DATA operation 410 to move data from the local memory 116A to the global memory 112 to make the local memory 116A available for data to be processed. The program then proceeds to the TASK WAITING test operation 412 to determine if a task is waiting to be processed. If a task is not waiting to be processed, the program branches along the NO path from the TASK WAITING test operation 412 to the ALL INPUTS HANDLED test 426. If a task is waiting to be processed, the program branches along the YES path from the TASK WAITING test operation 412 to initiate processing of the task. The program then proceeds to the SETUP operation 414 to setup the task execution parameters. The program then proceeds to the EXECUTE MESSAGE OUTPUT operation 416 to generate the execute task message to the related local processor 118A along path 124 to command execution of the task. The program then proceeds to the ALL INPUTS HANDLED test operation 426 to further process inputs and outputs.

If all of the inputs have not been handled, the program branches along the NO path from the ALL INPUTS HANDLED test operation 426 to the DATA AVAILABLE test operation 418 to test if data is available for another input. If data is not available, the program branches along the NO path from the DATA AVAILABLE test operation 418 to loop back to the ALL INPUTS HANDLED test operation 426. If data is available, the program branches along the YES path from the DATA AVAILABLE test operation 418 to the MOVE DATA operation 420 to move data from the global memory 112 to the local memory 116A for subsequent processing and to update the task status. The program then proceeds to the CONSUME MESSAGE OUTPUT operation 422 to generate a consume message to the local processor 118A that is the source of the data being processed to inform the source local processor 118A that the buffer in the global memory 112 is now available for use by the source processor. The program then loops back to the ALL INPUTS HANDLED test operation 426.

If all of the inputs have been handled, the program branches along the YES path from the ALL INPUTS HANDLED test operation 426 to the ALL OUTPUTS HANDLED test operation 428 to further process outputs. If all outputs are handled, the program branches along the YES path from the ALL OUTPUTS HANDLED test operation 428 to the READY test operation 316, as shown in FIG. 3, to determine if the task is ready to be executed, such as if data is available in a buffer in local memory and if the local processor is available for processing and if an output buffer is available, and to proceed as discussed for the SETUP operation 318 and the EXECUTE MESSAGE OUTPUT operation 320, as shown in FIG. 3. If outputs are not all handled, the program branches along the NO path from the ALL OUTPUTS HANDLED test operation 428 to the MOVE DATA operation 430 to move data from the local memory 116 to the global memory 112 for subsequent processing. The program then proceeds to the PRODUCE MESSAGE OUTPUT operation 432 to generate a produce message to the processor that is the destination of the data to be processed to inform the destination processor that the buffer in global memory is now full of data to be processed. The program then loops back along the path 434 to the ALL OUTPUTS HANDLED test operation 436 to test for more outputs to be handled.

Many alternative embodiments may be implemented from the teachings herein. For example, polling operations may be supplemented with or may be replaced with interrupt driven operations. The multiprocessor embodiment may be implemented with separate elements integrated together or may be implemented with an integrated product, such as the IOC System products manufactured by APTEC Computer Systems. Interprocessor communication of data or messages in implemented in various ways, including direct communication between processors and by a mailbox in global memory. A mailbox is implemented by a source control processor 118A processor storing data or storing a message in a predetermined location in the global memory 112 and by a destination processor polling the location in global memory 112 to access the data or message. In the preferred embodiment, generating of a message by the source control processor 114A when a buffer in the global memory 112 is loaded and generating of a message by the destination control processor 114N when a buffer in the global memory 112 is unloaded provides inter-processor handshaking. Alternatively, setting of a flag in the global memory 112 by the source control processor 114A when a buffer in the global memory 112 is loaded and resetting of a flag in the global memory 112 by the destination control processor 114N when a buffer in the global memory 112 is unloaded implements inter-processor handshaking. Distributed processors may be distributed in various ways including physical distribution, such as placed at remotely located places therebetween, and operational distribution, such as performing different processing tasks. Alternative program operations may also be provided. For example, a produce message may cause transition of a task in the destination control processor from a blocked state to an execution ready state. A consume message may cause transition of a task in the source control processor from a blocked state to an execution ready state. If a task state transition from a blocked state to an execution ready state occurs, then the local processor of the destination distributed processor processes the block of data transferred from the global memory to the local memory of the destination distributed processor or the local processor of the source distributed processor processes the block of input data already in its local memory.

Thus there had been described a new and improved distributed multi-processor system and method. It is to be understood that the above-described embodiments are illustrative of some of the many specific embodiments that represent applications of the principles of the present invention. Clearly, numerous and varied other arrangements may be designed by those skilled in the art without departing from the scope of the invention.

What is claimed is:

1. A data driven control method for coordinating the scheduling and control of arithmetic tasks in a multiple computer system having a plurality of arithmetic processors, said data driven control method comprising the following steps:
    determining whether an arithmetic task has the necessary number of input data elements present at the input;
    determining whether the arithmetic task has the necessary amount of buffer space available at the output;
    determining whether the arithmetic task is in an execution ready condition; and
    executing the arithmetic task when it is in an execution ready condition.

2. A data driven control method for coordinating the scheduling and control of arithmetic tasks in a multiple computer system having a plurality of arithmetic processors, said data driven control method comprising the following steps:
    comparing the number of existing input data elements present at the input of an arithmetic task with a predetermined necessary number;
    comparing the amount of existing output buffer space present at the output of the arithmetic task with a predetermined necessary amount;
    determining whether the arithmetic task is in an execution ready condition; and
    executing the arithmetic task when it is in an execution ready condition.

3. A data driven method for coordinating the processing of arithmetic tasks in a multiple computer system having a plurality of arithmetic processors by determining whether an arithmetic task is in a blocked condition or is in an execution ready condition, said method comprising the following steps:
    receiving data comprising a first arithmetic task including input data elements in a first arithmetic processor;
    transferring said data from said first arithmetic processor to global memory;
    generating a produce message in said first arithmetic processor;
    transferring said produce message to a second arithmetic processor;
    determining availability of local memory in said second arithmetic processor in response to said produce message;
    transferring said data from said global memory to the local memory in said second arithmetic processor in response to finding sufficient local memory available;
    generating a consume message in said second arithmetic processor;
    transferring said consume message to said first arithmetic processor;
    comparing the number of input data elements present in said data with a predetermined necessary number to perform said first arithmetic task;
    comparing the amount of local memory available with the necessary amount required to store the result after performing said first arithmetic task;
    determining whether said first arithmetic task is in an execution ready condition or is in a blocked condition; and
    executing said first arithmetic task when it is in an execution ready condition.

* * * * *